United States Patent
Herbert et al.

(10) Patent No.: US 10,160,313 B1
(45) Date of Patent: Dec. 25, 2018

(54) BIODIESEL RESISTANT PVC/NBR RUBBER COMPOSITION

(71) Applicant: FORD MOTOR COMPANY BRASIL LTDA, Sao Baernardo do Campo (BR)

(72) Inventors: Cristiano Grings Herbert, Salvador Bahia (BR); Cristiane Carla Goncalves, Bahia (BR); Rodrigo Denizarte de Oliveira Polkowski, Bahia (BR); Angelo Nogueira Aguiar, Bahia (BR)

(73) Assignee: FORD MOTOR COMPANY BRASIL LTDA, San Bernardo Do Campo (BR)

( * ) Notice: Subject to any disclaimer, the term of this patent is extended or adjusted under 35 U.S.C. 154(b) by 0 days.

(21) Appl. No.: 15/945,271

(22) Filed: Apr. 4, 2018

(51) Int. Cl.
| | |
|---|---|
| *C08K 3/04* | (2006.01) |
| *B60K 15/04* | (2006.01) |
| *C08L 27/06* | (2006.01) |
| *C08F 236/06* | (2006.01) |
| *C08K 3/36* | (2006.01) |
| *C08F 220/44* | (2006.01) |

(52) U.S. Cl.
CPC ............ *B60K 15/04* (2013.01); *C08F 220/44* (2013.01); *C08F 236/06* (2013.01); *C08K 3/04* (2013.01); *C08K 3/36* (2013.01); *C08L 27/06* (2013.01); *B60K 2015/0458* (2013.01); *C10L 2200/0476* (2013.01)

(58) Field of Classification Search
CPC .... C08K 3/04; C08L 9/02; F16L 11/04; F16L 11/127
USPC ........ 428/34.1, 35.7; 525/213, 214, 232, 233
See application file for complete search history.

(56) References Cited

U.S. PATENT DOCUMENTS

| | | |
|---|---|---|
| 6,333,386 B1 | 12/2001 | Nishiyama et al. |
| 6,875,263 B1 | 4/2005 | Pillai et al. |
| 2007/0227609 A1 | 10/2007 | Kurimoto et al. |
| 2010/0021665 A1 | 1/2010 | Jackson |

FOREIGN PATENT DOCUMENTS

| | | |
|---|---|---|
| CN | 101597390 A | 12/2009 |
| CN | 101418086 B | 2/2011 |
| CN | 103509241 A | 1/2014 |
| CN | 104262707 A | 1/2015 |
| CN | 103073757 A | 4/2015 |
| CN | 105400199 A | 3/2016 |
| CN | 103113645 B | 8/2016 |
| CN | 104650414 B | 9/2016 |

(Continued)

OTHER PUBLICATIONS

Ismail, H. et al., "White Rice Husk Ash Filled Natural Rubber Compounds: the Effect of Multifunctional Additive and Silane Coupling Agents," http://www.sciencedirect.com/science/article/pii/S0142941898000300>, Polymer Testing, vol. 18, Issue 4, Jun. 1999, pp. 287-298.

(Continued)

*Primary Examiner* — Ellen S Wood
(74) *Attorney, Agent, or Firm* — Marla Johnston; Brooks Kushman P.C.

(57) ABSTRACT

A PVC/NBR rubber composition includes (A) 100 PHR polyblend (33-45 ACN) PVC/NBR, (B) 20-50 PHR conductive carbon black, (C) 1-100 PHR carbon black, (B) being more electrically conductive than (C), and (D) 5-30 PHR synthetic amorphous silica, wherein the rubber composition has electrical resistivity of less than $1 \times 10^6 \Omega$ measured according to SAE J2260.

20 Claims, 2 Drawing Sheets

(56) References Cited

FOREIGN PATENT DOCUMENTS

| CN | 104650421 A | 1/2017 |
|---|---|---|
| CN | 106317676 A | 1/2017 |
| CN | 106832463 A | 6/2017 |
| CN | 106928511 A | 7/2017 |
| GB | 925241 | 5/1963 |

OTHER PUBLICATIONS

Da Costa, H. M. et al., "The Effect of Coupling Agent and Chemical Treatment on Rice Husk Ash-filled Natural Rubber Composites," http://onlinelibrary.wiley.com/doi/10.1002/(SICI)1097-4628(20000516)76;7%3C1019::AID-APP5%3E3.0.CO;2-%23/abstract>, Journal of Applied Science, vol. 76, Issue 7, May 16, 2000, pp. 1019-1027.

Sereda, et al., "Rice Husk Ash in Polysiloxane Compounds", http://www.all-electronics.de/ai/resources/3c832ed9e5e.pdf, Elastomers and Plastics, 2001, pp. 474-476.

Ismail et al., "Effect of a Silane Coupling Agent on the Properties of White Rice Husk Ash-polypropylene/natural rubber Composites," Polymer International, vol. 50, Issue 5, May 2001, pp. 606-611.

TH160109A, "Manufacturing Process and Formulation of Low Carbon Rice Husk Ash Filled Biodegradable Thermoplastic Elastomer," Filed Apr. 19, 2012; Published: Feb. 23, 2017.

Princy, K. et al., "Studies on Conductivity of Nitrile Rubber and its Blends with NR, EPDM, and PVC," Journal of Plastics, Rubber and Composites, Macromolecular Engineering, Jul. 19, 2013, pp. 114-118, vol. 31, 2002, No. 3.

Pasa, V. et al., "Compatibility Study of NBR/PVC Blend With Gasolines and Ethanol Fuel," Jun. 2012, vol. 85, No. 2, pp. 195-206.

Movahed, S. et al., "Effect of Various Efficient Vulcanization Cure Systems on the Compression Set of a Nitrile Rubber Filled With Different Fillers," Journal of Applied Polymer Science, Nov. 21, 2014.

Pazur, R. et al., Effect of Plasticizer Extraction by jet Fuel on a Nitrile Hose Compound, Jun. 2015, vol. 88, No. 2, pp. 324-342.

Linhares, F., "Development of Biodiesel-Resistant Nitrile Rubber Compositions," Mar. 31, 2017, pp. I, III-IV, 1-24.

BIODIESEL RESISTANT PVC/NBR RUBBER COMPOSITION

TECHNICAL FIELD

The disclosure relates to a PVC/NBR rubber composition, a fuel filler hose made from the composition, and methods of making the composition and the hose.

BACKGROUND

In the interest of sustainability, a variety of alternative fuels are being developed. Among the alternative fuel types, biodiesel blends of different concentrations may be especially viable in certain parts of the world. Traditional automotive component materials, developed for fossil fuels, may not provide satisfactory results when biodiesel blends are utilized as fuel. Thus, use of such blends may require adjustment of the materials or newly-developed materials for the automotive industry, especially where the fuel blends frequently interact with the individual automotive components.

SUMMARY

In at least one embodiment, a PVC/NBR rubber composition is disclosed. The composition includes 100 PHR polyblend (33-45 ACN) NBR/PVC; about 20-50 PHR conductive carbon black; (C) about 1-100 PHR carbon black, (B) being more electrically conductive than (C); and (D) 5-30 PHR synthetic amorphous silica. The composition has electrical resistivity of less than $1 \times 10^6 \Omega$ measured according to SAE J2260. The component (B) may have a nitrogen surface area of about 155 m$^2$/g. The component (B) may have a mean particle size of about 22 nm. The component (B) may have OAN oil absorption of about 113 cc/100 gm according to D2414. The composition may include additional types of carbon black, each having a lower conductivity than the component (B). The composition may include about 33-37 PHR of the component (B). The component (C) may have a mean particle size of about 29-78 m$^2$/g. The composition may further include at least one of: (E) 0-30 PHR reinforcing agent(s); (F) 0-20 PHR coupling agent(s); (G) 0-80 PHR plasticizer(s); (H) 0-20 PHR cure activator(s); (I) 0-20 PHR cure accelerator(s); (J) 0-20 PHR cure agent(s); (K) 0-5 PHR antiozonant(s); and (L) 0-5 PHR antioxidant(s).

In an alternative embodiment, a PVC/NBR rubber composition is disclosed. The composition includes 100 PHR polyblend (33-45 ACN) NBR/PVC; about 20-50 PHR conductive carbon black; (C) about 0-100 PHR carbon black, (B) being more electrically conductive than (C); (D) 0-30 PHR synthetic amorphous silica; and (E) graphene oxide. The composition has electrical resistivity of less than $1 \times 10^6 \Omega$ measured according to SAE J2260. The composition includes about 30-33 PHR of the component (B) and about 2-5 PHR of the component (E). The component (B) may have a nitrogen surface area of about 155 m$^2$/g. The component (B) may have a mean particle size of about 22 nm. The composition may include the component (D) in the amount of at least 5 PHR. The composition may further include at least one of: (F) 0-20 PHR coupling agent(s); (G) 0-80 PHR plasticizer(s); (H) 0-20 PHR cure activator(s); (I) 0-20 PHR cure accelerator(s); (J) 0-20 PHR cure agent(s); (K) 0-5 PHR antiozonant(s); and (L) 0-5 PHR antioxidant(s).

In a yet alternative embodiment, a fuel filler hose is disclosed. The fuel filler hose includes a PVC/NBR rubber composition having the following components: (A) 100 PHR polyblend NBR/PVC; (B) 20-50 PHR conductive carbon black; (C) 0-100 PHR carbon black, (B) being more electrically conductive than (C); (D) 0-30 PHR synthetic amorphous silica; and (E) 0-10 graphene oxide such that the fuel filler hose has electrical resistivity of less than $1 \times 10^6 \Omega$ measured according to SAE J2260. The composition may include the component (C), (D), (E), or a combination thereof, in the amount of at least 1 PHR. The hose may have a tensile strength at break of at least 22 MPa measured according ASTM D412. The hose may have a hardness Shore A of about 85 measured according to ASTM D2240. The hose may have elongation at break of at least 400% measured according to ASTM D412. The hose is configured as a biodiesel gas tank inlet neck.

DETAILED DESCRIPTION

Figure 1:
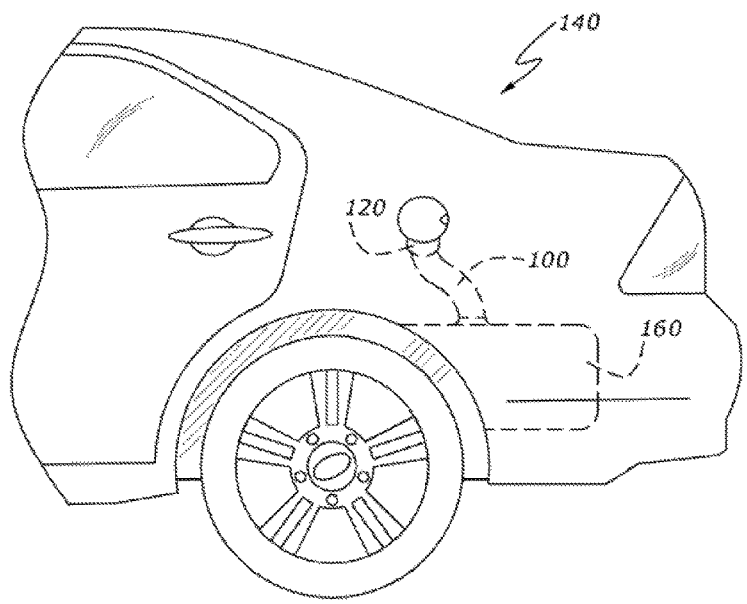
FIG. 1 schematically depicts a portion of an example automotive vehicle with a fuel filler hose including rubber composition according to one or more embodiments.
Figure 2:
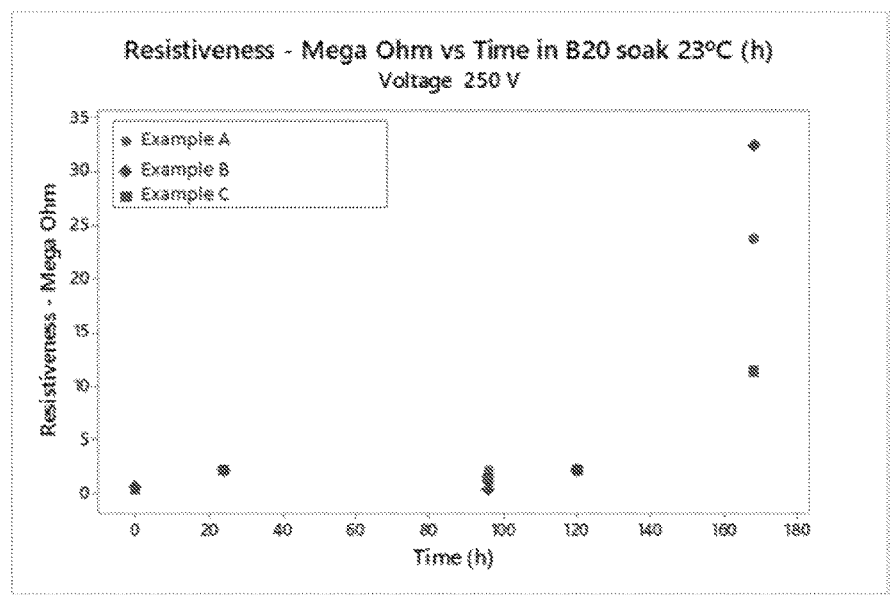
FIG. 2 depicts a plot of electrical resistivity versus time of Examples A-C in biodiesel B20 soak at 23° C. at 250 V.
Figure 3:
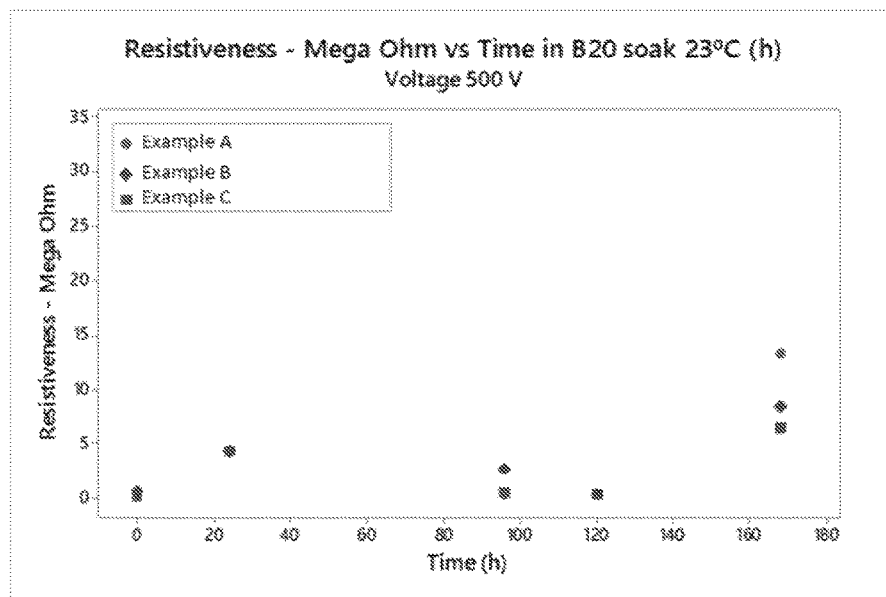
FIG. 3 depicts a plot of electrical resistivity versus time of Examples A-C in biodiesel B20 soak at 23° C. at 500 V.
Figure 4:
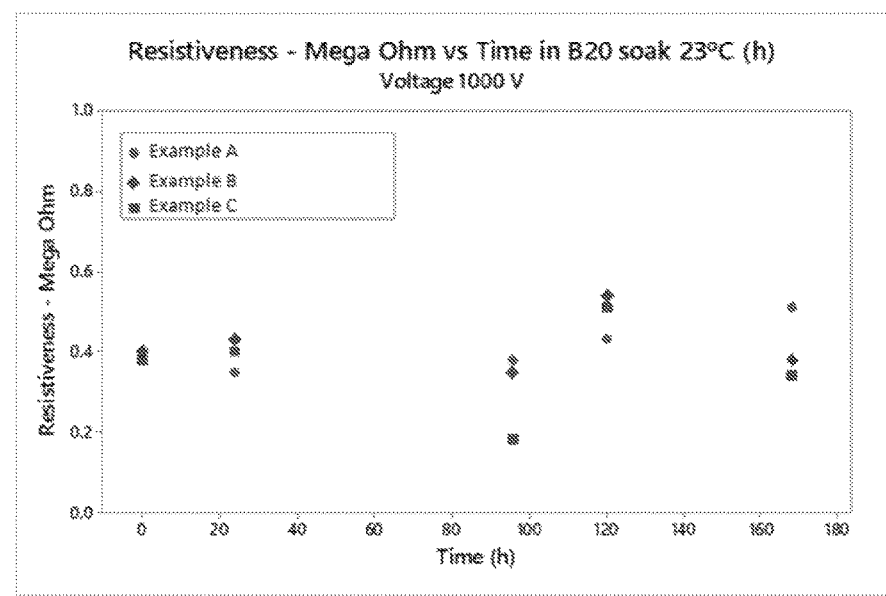
FIG. 4 depicts a plot of electrical resistivity versus time of Examples A-C in biodiesel B20 soak at 23° C. at 1000 V.

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Except where expressly indicated, all numerical quantities in this description indicating dimensions or material properties are to be understood as modified by the word "about" in describing the broadest scope of the present disclosure.

The first definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same technique as previously or later referenced for the same property.

The description of a group or class of materials as suitable for a given purpose in connection with one or more embodiments of the present invention implies that mixtures of any two or more of the members of the group or class are suitable. Description of constituents in chemical terms refers to the constituents at the time of addition to any combination specified in the description, and does not necessarily preclude chemical interactions among constituents of the mixture once mixed. The first definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same technique as previously or later referenced for the same property.

To provide a more sustainable fuel practices, certain entities have focused on incorporating biodiesel into diesel fuel. The resulting biodiesel blends have designations reflecting percentage of biodiesel with the petroleum diesel. Common biodiesel is B6 to B30, which contains 6 to 30% biodiesel, respectively. B100 designates pure biodiesel which may be used as a stock to produce lower blends. A concentration of 5% or less is typically designated as diesel fuel.

Inclusion of biodiesel in the diesel fuel has certain advantages such as decreased total particulate and soot emissions. Additionally, in the parts of the world where biodiesel is manufactured and economically available, biodiesel fuel may be a viable alternative to traditional fossil fuels. Besides developing specific engine characteristics complementing biodiesel, use of biodiesel blends in the automotive industry likewise requires compatible materials for delivery of such fuel into a gas tank and additional portions of a vehicle. An example automotive component which has to be rendered biodiesel resistant is a fuel hose, fuel filler hose, fuel filler pipe, also known as the gas tank inlet neck, a schematic example of which is depicted in FIG. 1. An alternative example component may be a fuel sender gasket.

Various materials based on rubber have been introduced for production of the inlet neck or fuel filler hose and other automotive components which routinely come in contact with fuel. Yet the traditional rubber-based materials have shown relatively high swell and degradation on elongation after immersion in various biodiesel blends.

Thus, there has been a need to develop a material resistant to various biodiesel blends of at least up to B30, which would not succumb to the biodiesel chemistry, which would retain mechanical properties even after a prolonged contact with the biodiesel blends, and which at the same time would have electrical resistivity or resistiveness of less than $1 \times 10^6 \Omega$ measured according to SAE J2260, to comply with automotive requirements.

In one or more embodiments, a poly(vinyl chloride) (PVC)/butadiene-acrylonitrile copolymer (NBR) synthetic rubber composition overcoming one or more problems mentioned above is disclosed. The rubber composition has a relatively high actylonitrile content of about 28 to 50 wt. %, 34 to 48 wt. %, or 41 to 45 wt. %, based on the weight of the PVC/NBR polyblend polymer base. The ratio of the PVC/NBR may be from 80/20 to 60/40, the ratio may be from 75/25 to 55/45, the ratio may be 70/30.

The rubber composition includes additional components to bring about desirable mechanical and other properties. Throughout the disclosure, the rubber compound ingredients or components are given as part per 100 by weight of the rubber polymer mentioned above with the designation Parts Per Hundred Rubber (PHR).

In one or more embodiments, the rubber composition may include carbon black. Carbon black is produced by an incomplete combustion of heavy petroleum products such as tar with the addition of vegetable oil. Various subtypes of carbon black may be used including acetylene black, channel black, furnace black, lamp black, thermal black, etc. Carbon black types may differ by particle size, structure, physical form, surface chemistry, porosity, and other features which further determine various properties. For example, particle size influences a variety of properties including tinting abilities. There is a correlation between a higher surface area of smaller particle diameters and greater jetness, higher conductivity, improved weatherability, and higher viscosity. Structure, relating to three-dimensional fusion of individual carbon black particles to form aggregates influences, for example, viscosity and electrical conductivity. For instance, highly structured carbon black provides higher viscosity and greater electrical conductivity. On the other hand, certain properties such as high surface chemistry, or more oxidized surface lower electrical conductivity, increase electrical resistivity, improve pigment wetting, dispersion, and reduce viscosity.

The rubber composition disclosed herein may include a conductive carbon black having a relatively high porosity. The conductive carbon black may have a relatively small particle size, high structure, high porosity defined as a ratio of external surface area to the total surface area, and a relatively low surface functionality. The conductive carbon black may have the properties listed in Table 1 below. NSA surface relates to a total surface area obtained with the BET NSA method by nitrogen adsorption. STSA surface area relates to an external surface area predicted by STSA by nitrogen adsorption.

The rubber composition may include at least two different types of conductive carbon black. For example, a first conductive carbon black may have a lower electrical conductivity than a second conductive carbon black. In addition, the rubber composition may include at least a third type of carbon black. The third type of carbon black may have the lowest electrical conductivity of all types of carbon black included in the rubber composition. Thus, the third type of carbon black may have larger particle size, smaller surface area, and higher surface chemistry than the remaining types of carbon black incorporated in the rubber composition.

The ratio of the first, second, and third carbon black may be 1:1:1, 2:1:1, 2:1:0, 1:1:0, 3:2:1, 5:1:1, 7:1:1, or different. For example, majority of the carbon black present may be either the first, second, or third carbon black. The rubber composition may include only the first, second, or third type of carbon black.

The carbon black with relatively low conductivity may be added to improve mechanical properties such as high tensile strength, wear resistance, impart high modulus, improve extrusion, hysteresis, etc.

TABLE 1

Non-limiting examples of carbon black types and their specifications which may be included in the rubber composition disclosed herein

| Conductive Carbon Black | NSA surface area [m²/g] D6556 | STSA surface area [m²/g] | Oil Absorption (OAN)(beads) [cm³/100 g] Test Method D2414 | Tinting strength D3265 | Mean Particle Size [nm] D3849 | Commercial Name |
|---|---|---|---|---|---|---|
| Type 1 | 155 | 109 | 113 | 107 | 22 | Raven P |
| Type 2 | 205 | 124 | 115 | 123 | 20 | Conductex SC Ultra |
| Type 3 | 185 | 125 | 141 | 115 | — | Conductex K ultra |
| Type 4 | 85 | 82 | 160 | 97 | — | Conductex 7097 Ultra |
| Type 5 | 75 | 73 | 140 | 98 | — | Conductex 7093 |
| Type 6 | 63 | 54 | 140 | 65 | — | Conductex 7067 Ultra |
| Type 7 | 63 | 56 | 156 | 70 | — | Conductex 7060 Ultra |
| Type 8 | 55 | 50 | 170 | 61 | 42 | Conductex 7055 Ultra |
| Type 9 | 43 | 42 | 121 | 55 | 56 | Conductex 7051 Ultra |
| Type 10 | 43 | 42 | 122 | 60 | 56 | Conductex 7054 Ultra |
| Type 11 | 39 | 39 | 121 | 58 | — | Conductex 7095 Ultra |
| Type 12 | 72-84 | 70-82 | 96-108 | 98-110 | 26-30 | N-330 |
| Type 13 | 24-34 | 23-33 | 60-70 | 50-64 | 61-100 | N-762 |

The rubber composition may include about 0 to 50 PHR of each type of carbon black. The total carbon black PHR may be up to 80, 90, 100, 110, 120, 130, 140, or 150 PHR. A non-limiting example rubber composition may include about 10-60 PHR, 20-50 PHR, or 30-40 PHR of the first, most electrically conductive carbon black, about 0-100 PHR, 10-90 PHR, or 20-80 PHR of a conductive carbon black less conductive than the first carbon black, and/or about 0-50 PHR, 10-40 PHR, or 20-30 PHR of a third, least conductive carbon black.

In at least some embodiments, a PHR portion of the conductive carbon black may be replaced by another conductive component. Alternatively, another conductive agent may be included in addition to the conductive carbon black. An example conductive component may be graphene oxide or graphite oxide, graphitic oxide, or graphitic acid. Graphene oxide is a compound formed by treating graphite with strong oxidizers. The degree of oxidation determines the conductivity of graphene oxide. For example, a fully oxidized graphene oxide may be considered an insulator. Lesser degree of oxidation renders graphene oxide electrically conductive, yet less than pure graphene. To further increase electroconductivity of the graphene oxide, the disruption of sp2 bonding has to be restored by reducing graphene oxide. Removal of the oxygen groups renders graphene oxide more electroconductive, but also more difficult to disperse in other media. A method of synthesis may also influence conductivity of graphene oxide. Highly electrically conductive graphene oxide may be included in the rubber composition. Alternatively, a relatively electrically non-conductive or electrically non-conductive graphene oxide may be added to the rubber composition.

Graphene oxide may be added to the rubber composition to increase mechanical properties, crosslink densities, and decrease swelling. The rubber composition may include about 0-10 PHR, 1-9 PHR, or 2-5 PHR of graphene oxide. The rubber composition may include about 0, 0.5, 1, 2, 3, 4, 5, 6, 7, 8, 9, or 10 PHR of graphene oxide. The PHR amounts named herein relating to the content of graphene oxide may be in addition to, or partially replacing, an equal amount of at least one type of carbon black named above. For example, the 2-5 PHR of graphene oxide may replace 2-5 PHR of conductive carbon black in the rubber composition.

Besides the above-mentioned components, the rubber composition may include synthetic amorphous silica (SAS). SAS is a form of silicon dioxide, a white dry powder or dispersion. In contrast to naturally occurring amorphous silica such as diatomaceous earth which may also contain crystalline forms of silica, the manmade SAS includes nearly 100% pure amorphous silica. There are several forms of SAS: pyrogenic SAS, precipitated SAS, and a gel, which feature different properties, as can be seen in Table 2 below.

TABLE 2

Physical properties of SAS forms

| Property | Pyrogenic SAS | Precipitated SAS | Gel SAS |
|---|---|---|---|
| Purity, wt. % $SiO_2$ | >99.8 | >95 | >95 (dry) |
| Specific surface area (BET) [m²/g] | 50-400 | 30-500 | 250-1000 |
| Particle size [nm] | 5-50 | 5-100 | 1-10 |
| Aggregate size [um] | 0.1-1 | 0.1-1 | 1-20 |
| Mean pore size [um] | — | >0.03 | 0.0001-1 |
| Specific gravity [g/cm³] | 2.2 | 1.9-2.2 | 1.8-2.2 |

The rubber composition may include about 0-30 PHR, 5-25 PHR, or 10-20 PHR of SAS. As will be explained below, at least a portion of SAS may be replaced by an alternative component.

In addition to the components named above, the rubber composition may contain rice husk ash. The husk is the coating of a grain of rice. The husk includes various materials such as silica and lignin. Rice husk or rice hull forms on average about 28% of the rice paddy, which means several hundred million tons of total global production as a by-product of rice production during milling. The husk may be burnt in boilers to replace fossil fuels. About 75-80% of the burning under controlled temperature below 800° C. produces organic volatile matter, and the about 20-25% balance forms ash or rice husk ash (RHA).

RHA is an amorphous silica having cellular, honeycomb morphology. RHA may contain about 85-95%, 87-92%, or 90-91% amorphous silica. Besides amorphous silica, RHA may contain other components such $Al_2O_3$, $Fe_2O_3$, CaO, MgO, $Na_2O_3$, $Na_2O$, $K_2O$, $CO_2$, $P_2O_5$, MnO, $Rb_2O$, Cl, S, the like, or a combination thereof. The amount of these components may be from 0-10 wt. %, 1-6 wt. %, or 2-5 wt. %, based on the total weight of the RHA. Non-limiting examples of RHA compositions are listed in Table 3 below. An average particle size of RHA may be about 10-70 μm, 20-60 μm, or 30-50 μm. BET nitrogen adsorption of RHA may be about 5-35 m$^2$/g, 8-20 m$^2$/g, or 10-12 m$^2$/g. Moisture content of the RHA may be about 8.5-10.5%, 9-10%, or 9.25-9.75%.

TABLE 3

Non-limiting examples of RHA compositions.
Weight is provided in wt. %,
based on the weight of the total RHA composition.

| Component | RHA 1 [wt. %] | RHA 2 [wt. %] | RHA 3 [wt. %] | RHA 4 [wt. %] |
|---|---|---|---|---|
| $SiO_2$ | 90.67 | 89.90 | 88.32 | 93.4 |
| $K_2O$ | 2.17 | 4.50 | 2.91 | 1.4 |
| CaO | 1.12 | 1.01 | 0.67 | 0.31 |
| $P_2O_5$ | 0.58 | 2.45 | 0.00 | 0.8 |
| $SO_2$ | 0.28 | 0.00 | 0.00 | 0.00 |
| Cl | 0.22 | 0.00 | 0.00 | 0.00 |
| MnO | 0.19 | 0.14 | 0.00 | 0.00 |
| MgO | 0.18 | 0.79 | 0.44 | 0.35 |
| $Al_2O_3$ | 0.14 | 0.46 | 0.46 | 0.05 |
| $Fe_2O_3$ | 0.11 | 0.47 | 0.67 | 0.06 |
| $Rb_2O$ | 0.01 | 0.00 | 0.00 | 0.00 |
| $Na_2O$ | 0.00 | 0.00 | 0.00 | 0.1 |
| $Na_2O_3$ | 0.00 | 0.00 | 0.12 | 0.00 |

The rubber composition may include about 0-20 PHR, 5-15 PHR, or 10-12 PHR of RHA. In one or more embodiments, RHA may replace a portion of SAS, carbon black, or both in the rubber composition. For example, about 5 PHR of RHA may replace about 5 PHR of SAS. In an alternative example, about 10 RHA may replace about 5 PHR of SAS and 5 PHR of carbon black. It is contemplated that up to about 20, 40, 60, 80, or 100% SAS and up to 5, 10, 15, 20, 25, 30, 35, 40, 45, 50, 55, 60, 65, 70, or 75% of carbon black may be replaced by RHA. Alternatively, the rubber composition may contain only SAS and/or carbon black and no RHA.

RHA is a renewable resource also dubbed "green silica." RHA may be included as a viable replacement bi-product. RHA is typically utilized for heating purposes, as a portion of cementitious materials, or a component in water remediation products. Using RHA in the rubber composition disclosed herein provides an alternative use for a product which is economical and readily available in areas with high rice production and consumption. Utilizing RHA as described herein may thus render the rubber composition more economical, ecological, and its production more sustainable.

Additionally still, the rubber composition may include one or more reinforcing agents, cure activators, cure accelerators, cure agents, antiozonants, antioxidants, plasticizers, coupling agents, the like, or a combination thereof.

The reinforcing agent may be any compound capable of improving physical properties of the rubber composition such as resilience to the biodiesel blends, toughness, tensile strength, tear strength, abrasion resistance, aging resistance, etc. The reinforcing agents may include some of components named above such as different types of carbon black, graphene oxide, RHA, or amorphous silica. Additional reinforcing agents may include additional pigments.

An alternative reinforcing agent may include reinforcing fibers such as textile fibers, for example cotton, wool, rayon, polyester, polyamide, aromatic polyamides. Other fibers are contemplated and may include polyethylene, polypropylene or hemp, sisal, jute, coconut, flax, straw, grass, and other fibers available directly from natural sources, as well as chemically modified natural fibers, for example chemically modified cellulose fibers, cotton fibers, etc. Suitable natural fibers also include abaca, cantala, caroa, henequen, istle, Mauritius, phormium, bowstring, sisal, kenaf, ramie, roselle, sunn, cadillo, kapok, broom root, coir, crin vegetal, and piassaua. The list of natural fibers is illustrative and not limiting. Examples of chemically modified fibers also include azlon (regenerated natural proteins), regenerated cellulose products including cellulose xanthate (rayon), cellulose acetate, cellulose triacetate, cellulose nitrate, alginate fibers, casein-based fibers, and the like. The rubber composition may include about 0-30 PHR, 5-25 PHR, or 10-20 PHR of reinforcing agent(s).

The rubber composition may include one or more cure activators or vulcanization activators. Such compounds have a strong effect on cross linking reactions of diene rubbers, may increase speed of vulcanization, cross-linking density, and reversion resistance. Activators may be organic and inorganic. A combination of both may be used. An example cure activator may be stearic acid, palmitic acid, lauric acid, their zinc salts, activators based on thiazoles like MBT, MBTS, alkaline activators, zinc oxide, or the like. The rubber composition may include about 0-20 PHR, 5-15 PHR, or 7-10 PHR of cure activator(s). In at least one embodiment, the rubber composition may include just inorganic cure activator such as zinc oxide in the amount of about 0.1-10 PHR, 2.5-7.5 PHR, or 4-5 PHR. In an alternative embodiment, the rubber composition may include the same amount of an organic and inorganic activator, for example about 1-5 PHR.

The rubber composition may also include one or more cure accelerator. Accelerators enhance speed of vulcanization and allow vulcanization to proceed at a lower temperature at a greater efficiency. Non-limiting examples of accelerators may include accelerators based on aldehyde amine, guanidine, thiazole, thiophosphate, sulfonamides, thiourea, thiuram, dithiocarbamate, xanthates, or the like. Specific example accelerators may include BA, HMT, DPG, DOTG, MBT, MBTS, ZMBT, ZBDP, CBS, TBBS, MBS, DCBS, ETU, DPTU, DBTU, TMTM, TMTD, DPTT, TBzTD, ZDMC, ZDEC, ZDBC, ZBEC, ZIX, or the like. The accelerator(s) may be primary, secondary accelerators, or both. For example, primary accelerators may be based on thiazoles or sulfonamide and may increase processing safety, optimize cross-linking density and reversion delay. The secondary accelerators may be based on guanidines, thiurams, or dithiocarbamates and may be used to increase the speed of vulcanization. The rubber composition may include about 0-20 PHR, 2-15 PHR, or 10-12 PHR of cure accelerator(s).

The rubber composition may further include one or more cure agents. A cure or curing agent is a substance enabling crosslinking of the rubber composition. A non-limiting examples of cure agents may include sulphur sources, peroxides, metal oxides, amines, phenolic resins, carbon-based sources, silica-based sources, or the like. Specific curing agents may include magnesium oxide, zinc oxide, organic peroxide, DTDM, or the like. The rubber composition may include about 0-20 PHR, 2-15 PHR, or 3-7 PHR of one or more cure agent(s).

An additional component of the rubber composition disclosed herein may be one or more plasticizer(s), processing aids, softeners, or extenders. A plasticizer may be any substance capable of to producing and/or promoting plasticity and flexibility at low temperature. A plasticizer may further reduce brittleness, hardness, stiffness, and energy required for processing, improve dispersion of individual components, increase elongation at break, or a combination thereof. Example plasticizers may be solvents, oils, mineral oils, waxes, fatty acids and their salts, aromatic plasticizers, naphthenic plasticizers, paraffinic plasticizers, derivatives of phthalic, adipic, and sebacic acid esters, trichresil or diphenylcresyl phosphates. Any plasticizer may be chosen as long as the plasticizer is compatible with the copolymer. Specific examples of plasticizers may include DOTP, TOTM, or a combination thereof. The rubber composition may include about 0-80 PHR, 15-60 PHR, or 30-40 PHR of plasticizer(s).

One or more coupling agents may be also incorporated into the rubber composition disclosed herein. A coupling agent may be any compound which enables coupling on non-black pigments to the polymer backbone. A coupling agent may contribute to improved abrasion resistance, higher compound modulus, lower hysteresis, or a combination thereof. An example coupling agent may be a silane coupling agent. The coupling agent may be Bis (3-triethoxysilylpropyl) tetrasulfide, 3-Thiocyanatopropyltriethoxy silane, Bis (3-triethoxysilylpropyl) disulfide, 3-Mercaptopropyltriethoxy silane, γ-Glycidyloxypropyl trimethoxy silane, Vinyl tri(2-methoxyethoxy) silane, γ-Methacryloxypropyl trimethoxy silane, Aminopropyl triethoxy silane, poly(ethylene glycol), or the like. The rubber composition may include about 0-20 PHR, 5-15 PHR, or 8-10 PHR of coupling agent(s).

Among other components of the herein-disclosed rubber composition may be one or more antioxidants. Antioxidants are substances capable of inhibiting oxidation. Non-limiting example antioxidants may be based on phenolics, benzimidazoles, quinolines, phosphites, or amines. Specific example antioxidants may include 2,6-Di-t-butyl-p-cresol, Butylated rxn product of p-cresol & dicyclopentadiene, Hindered Phenol, 2,2'-methylene-bis-(4-methyl 6-t-butyl phenol), 2,5-di-tert-amyl hydroquinone, 4,4'-butylidenebis (6-tert-butyl-m-cresol), Zn Salt of 2-Mercapto 4 (5)-Methylbenzimidazole, 4/5-Methyl Mercapto Benzimidazole, 2,2,4-Trimethyl-1,2-Hydroquinoline, 2,2,4-Trimethyl-1,2-Dihydroquinoline, Trisnonylphenyl Phosphite, Phenyl-A-Naphthylamine, Octylated Diphenylamine, or 4,4'-Bis(a,a'-dimethylbenzyl/diphenylamine), or a combination thereof. The rubber composition may include about 0-5 PHR, 1-4 PHR, or 2-3 PHR of antioxidant(s).

Another component may be one or more antiozonants. Antiozonants may be any substances that prevent or slow down degradation of the rubber composition by ozone. Non-limiting examples of antiozonants may be based on phenylene diamines or acetals. An antiozonant may include N-Isopropyl-N'-Phenyl-P'-Phenylene Diamine, N-(1,3-Dimethyl Butyl)-N'-Phenyl-P-Phenylene Diamine (6PPD), Mixed Diaryl-P-Phenylene Diamine, or Bis (1,2,3,6-Tetrahydro-benzaldehyde)-Pentaerythrityl Acetate. The rubber composition may include about 0-5 PHR, 1-4 PHR, or 2-3 PHR of antiozonant(s).

Further still, the rubber composition disclosed herein may contain additional components, for example detactifying agent(s) such calcium carbonate, ozone inhibitor(s) such as Nickel Dibutyl Dithiocarbamate, retarder(s) such as Modified Phthalic Anhydride, Phthalic Anhydride, Salicyclic Acid, Benzoic Acid, Aromatic Sulfonamide, 4,5-Methylbenzotriazole, or N-(cyclohexylthio)phthalimide, peptizer(s) such as 2,2'-Dibenzoamido Diphenyldisulfide, Aryl Amine Hydrocarbon, Alkyl Sulfide Hydrocarbon, or the like. The additional components may be included in the amount of about 0-30 PHR, 5-25 PHR, or 10-20 PHR.

The rubber composition disclosed herein is resistant to biodiesel fuel blends from at least B6 to B30. The rubber composition has lower swell, higher tensile strength, greater elongation at break, and better biodiesel stability than prior art compositions. The rubber composition has electrical resistivity of less than $1 \times 10^6 \Omega$ measured according to SAE J2260.

In at least one embodiment, an automotive component may be made from the rubber composition disclosed herein. A non-limiting example of such component is a fuel filler hose 100 shown in FIG. 1. The fuel filler hose 100 may transport fuel from a fuel inlet 120 disposed on the outside of an automotive vehicle 140 into which a fuel supply nozzle is inserted during refueling and the gas tank 160 inlet which may contain a valve. The rubber composition disclosed herein may form at least a portion of the fuel filler hose 100, for example a portion immediately adjacent to the fuel tank 160, or the entire fuel filler hose 100.

The hose 100 may be structured as a reinforced tube having a plurality of layers. For example, the rubber composition may form one or more layers of the hose 100. The at least one layer may be in interior or exterior layer. The layer may come in contact with the fuel routinely or occasionally. The contact may be continuous or discontinuous. The rubber composition may allow production of a flexible hose 100. The rubber composition may form a lining of the hose 100 which forms the innermost part of the hose and is required to resist the action of the biodiesel blends traveling to the fuel tank 160. The rubber composition may form a middle layer, adjacent to the lining. The middle layer may contain fiber reinforcements. The rubber composition may form the outer layer or cover which forms a protective layer capable of resisting weather, chemicals, abrasion, and other factors.

The hose 100 may be manufactured, for example, by extruding a lining of the hose 100 from the rubber composition, braiding or spiraling textile around the lining, applying an outer cover made from the rubber composition disclosed herein, using for example, cross-head extrusion. Other methods and additional materials are contemplated.

A method for preparing the rubber composition is also disclosed herein. The individual components may be homogenized, mixed, or compounded, together by mixing raw components in proportions according to PHR indicated above. The mixing may be provided, for example, in a Banbury mixer which resembles a robust dough mixer having two interrupted spiral rotors moving in the opposite directions at about 30-40 rpm. The power input may be up to about 1200 kilowatts for a 250 kg batch.

The method may include measuring individual components. The method may further include adding the polymer base into the mixer prior to adding additional components. The duration of the mixing may be about 1-5 min, 2-4 min, or 3-3.5 minutes. Additional components are then added with the exception of any accelerators. Mixing may continue for additional 1-10 min, 2-8 min, or 4-5 min to form an intermediate mixture. The intermediate mixture is removed from the mixture and cooled down. Cooling may be at ambient temperature and pressure. Alternatively, the intermediate mixture may be exposed to lower than ambient temperatures to speed up the cooling process. When cooled, the intermediate mixture may be divided into pieces, for example by cutting. Accelerators and the pieces of the intermediate mixture may be inserted into the mixer and mixed for about 2-10 min, 3-8 min, or 5-7 min to provide the rubber composition mixture. The rubber composition mixture may be vulcanized.

EXAMPLES

Examples A-E were prepared according to the method described above and PHRs of individual components listed below in Table 4. The polymer base was mixed for up to 1 minute on a Banbury mixer. Additional components, except for accelerators, were added and mixed for additional 1-4 minutes. The intermediate mixture was removed from the mixer and cooled for 1 hour. The intermediate mixture was subsequently cut into pieces and mixed with accelerator(s) in the Banbury mixer for 2 minutes. Vulcanization was conducted in a hydraulic press to obtain square sheets having dimensions of 150 mm×150 mm for testing.

The individual components of Examples A-E are listed in Table 4 below. Values for individual components are listed in PHR.

TABLE 4

Component list of Examples A-E

| Component | Example A | Example B | Example C | Example D | Example E |
|---|---|---|---|---|---|
| Polymer base | 100 | 100 | 100 | 100 | 100 |
| Conductive carbon black Raven P | 35 | 35 | 35 | 33 | 33 |
| Graphene oxide | 0 | 0 | 0 | 2 | 2 |
| RHA | 0 | 0 | 5 | 0 | 10 |
| Amorphous silica | 0 | 5 | 0 | 0 | 0 |
| Plasticizer(s) | 10 | 10 | 10 | 10 | 10 |
| Cure activator(s) | 6 | 6 | 6 | 6 | 6 |
| Antioxidant(s) | 3 | 3 | 3 | 3 | 3 |
| Cure accelerator(s) | 4 | 4 | 4 | 4 | 4 |
| Cure agent(s) | 2 | 2 | 2 | 2 | 2 |
| Antiozonant(s) | 2 | 2 | 2 | 2 | 2 |
| Coupling agent(s) | 1 | 1 | 1 | 1 | 1 |

Testing of Examples A-C was conducted according to the standard methods of the industry: hardness shore A, tensile strength at break, elongation at break. Results and test methods are listed in Table 5 below.

TABLE 5

Results and test methods for Examples A-C

| Property [unit] | Test method | Example A | Example B | Example C |
|---|---|---|---|---|
| Hardness Shore A | ISO 868/ASTM D2240 | 85 | 85 | 85 |
| Tensile Strength at Break [MPa] | ISO 37/ASTM D412, Die C | 22.7 ± 1.3 | 23.5 ± 0.9 | 23.5 ± 0.4 |
| Elongation at Break [%] | ISO 37/ASTM D412, Die C | 430 ± 32 | 448 ± 20 | 451 ± 13 |

Examples A-C were also tested for electrical resistivity to Biodiesel B20 according to SAE J2260. Results for Examples A-C are listed in Table 6 below. As is apparent from Table 6 below, resistiveness at 250 V and 500 V increased after B20 soaking to more than $1\times10^6\Omega$ for Examples A-C. Examples A-C were conductive at 1000 V even after B20 soaking $<1\times10^6\Omega$.

TABLE 6

Results of the electrical resistivity test method according to SAE J2260 for Examples A-C

| Testing Conditions | Voltage | Example A | Example B | Example C |
|---|---|---|---|---|
| Resistivity at 0 h in B20 at 26° C. 76% HR | 9 V, Mega Ω | 1.36 | 1.41 | 1.34 |
| | 250 V, Mega Ω | 0.32 | 0.69 | 0.32 |
| | 500 V, Mega Ω | 0.42 | 0.68 | 0.26 |
| | 1000 V, Mega Ω | 0.38 | 0.40 | 0.38 |
| Resistivity at 24 h in B20 at 26° C. 62% HR | 9 V, Mega Ω | 29.4 | 26.7 | 27.3 |
| | 250 V, Mega Ω | 2.20 | 2.20 | 2.20 |
| | 500 V, Mega Ω | 4.30 | 4.40 | 4.40 |
| | 1000 V, Mega Ω | 0.35 | 0.43 | 0.40 |
| Resistivity 96 h in B20 | 9 V, Mega Ω | 16.02 | 22.74 | 16.03 |
| | 250 V, Mega Ω | 2.20 | 0.32 | 1.33 |
| | 500 V, Mega Ω | 0.44 | 2.67 | 0.45 |
| | 1000 V, Mega Ω | 0.38 | 0.35 | 0.18 |
| Resistivity 120 h in B20 | 9 V, Mega Ω | 13.57 | — | 13.47 |
| | 250 V, Mega Ω | 220 | 2.20 | 2.20 |
| | 500 V, Mega Ω | 0.44 | 0.44 | 0.44 |
| | 1000 V, Mega Ω | 0.43 | 0.54 | 0.51 |
| Resistivity 168 h in B20 | 9 V, Mega Ω | 41.72 | — | 42.47 |
| | 250 V, Mega Ω | 23.80 | 32.4 | 11.4 |
| | 500 V, Mega Ω | 13.22 | 8.40 | 6.4 |
| | 1000 V, Mega Ω | 0.51 | 0.38 | 0.34 |
| Removed from B20 after 24 h | 9 V, Mega Ω | 15.6 | 15.44 | 12.13 |
| | 250 V, Mega Ω | 2.97 | 2.74 | 2.18 |
| | 500 V, Mega Ω | 2.45 | 3.10 | 0.33 |
| | 1000 V, Mega Ω | 0.69 | 0.73 | 0.86 |
| Removed from B20 after 48 h | 9 V, Mega Ω | 22.63 | 22.60 | 22.58 |
| | 250 V, Mega Ω | 2.90 | 2.20 | 2.20 |
| | 500 V, Mega Ω | 4.40 | 4.60 | 4.30 |
| | 1000 V, Mega Ω | 0.53 | 0.53 | 0.53 |
| Removed from B20 after 72 h | 9 V, Mega Ω | 22.11 | 22.14 | 21.35 |
| | 250 V, Mega Ω | 2.20 | 2.20 | 2.20 |
| | 500 V, Mega Ω | 4.40 | 4.40 | 4.30 |
| | 1000 V, Mega Ω | 0.56 | 0.54 | 0.53 |
| Removed from B20 after 96 h | 9 V, Mega Ω | 12.67 | 11.90 | 16.40 |
| | 250 V, Mega Ω | 2.20 | 2.20 | 2.20 |
| | 500 V, Mega Ω | 4.60 | 4.40 | 4.50 |
| | 1000 V, Mega Ω | 0.50 | 0.46 | 0.32 |
| Removed from B20 after 120 h | 9 V, Mega Ω | 12.66 | 12.67 | 13.00 |
| | 250 V, Mega Ω | 2.20 | 2.20 | 2.20 |
| | 500 V, Mega Ω | 4.60 | 4.30 | 4.60 |
| | 1000 V, Mega Ω | 0.36 | 0.29 | 0.37 |
| Removed from B20 after 144 h | 9 V, Mega Ω | 13.00 | 12.68 | 12.51 |
| | 250 V, Mega Ω | 2.20 | 2.20 | 2.20 |
| | 500 V, Mega Ω | 4.40 | 4.40 | 6.70 |
| | 1000 V, Mega Ω | 0.39 | 0.58 | 0.33 |
| Removed from B20 after 216 h | 9 V, Mega Ω | 14.05 | 14.10 | 12.56 |
| | 250 V, Mega Ω | 2.30 | 2.30 | 2.40 |
| | 500 V, Mega Ω | 4.20 | 4.20 | 4.20 |
| | 1000 V, Mega Ω | 0.17 | 0.35 | 0.17 |

Additional Examples F-I were prepared according to the same method as Examples A-C. The individual components of Examples F-I are listed in Table 7 below. Values for individual components are listed in PHR.

TABLE 7

Component list of Examples F-I

| Component | Example F | Example G | Example H | Example I |
|---|---|---|---|---|
| Polymer base | 100 | 100 | 100 | 100 |
| Carbon black N330 | 20 | 20 | 0 | 0 |
| Carbon black N762 | 0 | 0 | 0 | 20 |
| Conductive carbon black | 20 | 15 | 30 | 0 |
| Amorphous silica | 0 | 0 | 0 | 30 |
| RHA | 5 | 0 | 0 | 0 |
| Plasticizer(s) | 5 | 5 | 5 | 10 |

TABLE 7-continued

Component list of Examples F-I

| Component | Example F | Example G | Example H | Example I |
|---|---|---|---|---|
| Cure activator(s) | 6 | 6 | 6 | 6 |
| Antioxidant(s) | 2 | 2 | 2 | 2 |
| Cure accelerator(s) | 4 | 4 | 4 | 4 |
| Cure agent(s) | 2 | 2 | 2 | 2 |
| Antiozonant(s) | 2 | 2 | 2 | 3 |
| Coupling agent(s) | 1 | 0 | 1 | 0 |

Testing of Examples F-I was conducted according to the standard methods of the industry: hardness shore A, tensile strength at break, elongation at break. Results and test methods are listed in Table 8 below.

TABLE 8

Results and test methods for Examples F-H

| Property [unit] | Test method | Example F | Example G | Example H | Example I |
|---|---|---|---|---|---|
| Hardness Shore A | ISO 868/ASTM D2240 | 87.3 | 84.7 | 83.6 | 84 |
| Tensile Strength at Break [MPa] | ISO 37/ASTM D412, Die C | 21.7 ± 1.1 | 24.4 ± 1.2 | 22.9 ± 0.7 | 15.7 ± 1.0 |
| Elongation at Break [%] | ISO 37/ASTM D412, Die C | 361 ± 32 | 397 ± 33 | 441 ± 24 | 481 ± 22 |

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A PVC/NBR rubber composition comprising:
 (A) 100 PHR polyblend (28-45 ACN) PVC/NBR;
 (B) 20-50 PHR conductive carbon black;
 (C) 1-100 PHR carbon black, (B) being more electrically conductive than (C); and
 (D) 5-30 PHR synthetic amorphous silica,
 wherein the rubber composition has electrical resistivity of less than $1 \times 10^6 \Omega$ measured according to SAE J2260.

2. The rubber composition of claim 1, wherein the component (B) has a nitrogen surface area of about 155 m$^2$/g.

3. The rubber composition of claim 1, wherein the component (B) has a mean particle size of about 22 nm.

4. The rubber composition of claim 1, wherein the component (B) has OAN oil absorption of about 113 cc/100 gm according to D2414.

5. The rubber composition of claim 1, wherein the composition includes additional types of carbon black, each having a lower conductivity than the component (B).

6. The rubber composition of claim 1, wherein the composition comprises about 33-37 PHR of the component (B).

7. The rubber composition of claim 1, wherein the component (C) has a mean particle size of about 29-78 m$^2$/g.

8. The rubber composition of claim 1, wherein the composition further comprises at least one of:
 (E) 0-30 PHR reinforcing agent(s);
 (F) 0-20 PHR coupling agent(s);
 (G) 0-80 PHR plasticizer(s);
 (H) 0-20 PHR cure activator(s);
 (I) 0-20 PHR cure accelerator(s);
 (J) 0-20 PHR cure agent(s);
 (K) 0-5 PHR antiozonant(s); and
 (L) 0-5 PHR antioxidant(s).

9. A PVC/NBR rubber composition comprising:
 (A) 100 PHR polyblend NBR/PVC;
 (B) 20-50 PHR conductive carbon black;
 (C) 0-100 PHR carbon black, (B) being more electrically conductive than (C);
 (D) 0-30 PHR synthetic amorphous silica; and
 (E) 1-10 graphene oxide,
 wherein the rubber composition has electrical resistivity of less than $1 \times 10^6 \Omega$ measured according to SAE J2260.

10. The PVC/NBR rubber composition of claim 9, wherein the composition comprises about 30-33 PHR of the component (B) and about 2-5 PHR of the component (E).

11. The PVC/NBR rubber composition of claim 9, wherein the component (B) has a nitrogen surface area of about 155 m$^2$/g.

12. The PVC/NBR rubber composition of claim 9, wherein the component (B) has a mean particle size of about 22 nm.

13. The PVC/NBR rubber composition of claim 9, wherein the composition comprises the component (D) in the amount of at least 5 PHR.

14. The PVC/NBR rubber composition of claim 9, wherein the composition further comprises at least one of:
 (F) 0-20 PHR coupling agent(s);
 (G) 0-80 PHR plasticizer(s);
 (H) 0-20 PHR cure activator(s);
 (I) 0-20 PHR cure accelerator(s);
 (J) 0-20 PHR cure agent(s);
 (K) 0-5 PHR antiozonant(s); and
 (L) 0-5 PHR antioxidant(s).

15. A fuel filler hose comprising:
 a PVC/NBR rubber composition including:
 (A) 100 PHR polyblend NBR/PVC;
 (B) 20-50 PHR conductive carbon black;
 (C) 0-100 PHR carbon black, (B) being more electrically conductive than (C);
 (D) 0-30 PHR synthetic amorphous silica; and
 (E) 0-10 graphene oxide,
 such that the fuel filler hose has electrical resistivity of less than $1 \times 10^6 \Omega$ measured according to SAE J2260.

16. The hose of claim 15, wherein the composition comprises the component (C), (D), (E), or a combination thereof, in the amount of at least 1 PHR.

17. The hose of claim 15, wherein the hose has a tensile strength at break of at least 22 MPa measured according to ASTM D412.

18. The hose of claim 15, wherein the hose has a hardness Shore A of about 85 measured according to ASTM D2240.

19. The hose of claim 15, wherein the hose has elongation at break of at least 400% measured according to ASTM D412.

20. The hose of claim 15, wherein the hose is configured as a biodiesel gas tank inlet neck.

\* \* \* \* \*